(12) United States Patent
Tanaka et al.

(10) Patent No.: US 11,384,823 B2
(45) Date of Patent: Jul. 12, 2022

(54) MOTIVE POWER TRANSMISSION DEVICE FOR VEHICLE

(71) Applicant: Mazda Motor Corporation, Hiroshima (JP)

(72) Inventors: Hiroshi Tanaka, Aki-gun (JP); Tatsuhiko Iwasaki, Aki-gun (JP); Shinsuke Yoshiura, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/404,739

(22) Filed: Aug. 17, 2021

(65) Prior Publication Data

US 2022/0065337 A1 Mar. 3, 2022

(30) Foreign Application Priority Data

Sep. 2, 2020 (JP) .............................. JP2020-147739

(51) Int. Cl.
*F16H 37/08* (2006.01)
*F16H 48/08* (2006.01)

(52) U.S. Cl.
CPC ........... *F16H 37/082* (2013.01); *F16H 48/08* (2013.01); *F16H 2048/082* (2013.01)

(58) Field of Classification Search
CPC ...... F16H 37/0813; F16H 3/08; F16H 57/037; F16H 3/091
USPC ........................................ 475/198, 200, 201
See application file for complete search history.

(56) References Cited

U.S. PATENT DOCUMENTS

| | | | | |
|---|---|---|---|---|
| 1,103,048 | A * | 7/1914 | Janson ............... | B60K 17/3467 475/198 |
| 1,797,576 | A * | 3/1931 | Hoffman .................. | F16H 3/24 475/198 |
| 1,938,201 | A * | 12/1933 | Wells ...................... | F16H 37/08 475/198 |
| 1,961,809 | A * | 6/1934 | Wood ........................... | 475/198 |
| 2,027,013 | A * | 1/1936 | Barnes .................... | F16H 37/08 475/198 |
| 6,599,216 | B1 | 7/2003 | Wafzig et al. | |

FOREIGN PATENT DOCUMENTS

JP 2003509263 A 3/2003

* cited by examiner

*Primary Examiner* — Derek D Knight
(74) *Attorney, Agent, or Firm* — Alleman Hall Creasman & Tuttle LLP (57) ABSTRACT

A motive power transmission device for a vehicle includes a transmission that outputs motive power input from a drive source while performing gear-shifting for the motive power and a drive shaft that is coupled with the transmission and transmits the motive power from the drive source, which is output from the transmission, to a drive wheel. The transmission has a transmission mechanism unit that is arranged in a transmission casing such that an axis line extends in a vehicle front-rear direction and that performs gear-shifting for the motive power from the drive source. The drive shaft extends in a vehicle width direction on a central side of the transmission mechanism unit in the vehicle front-rear direction and is provided such that the drive shaft passes through the transmission casing.

10 Claims, 8 Drawing Sheets

MOTIVE POWER TRANSMISSION DEVICE FOR VEHICLE

TECHNICAL FIELD

The present disclosure relates to a motive power transmission device for a vehicle.

BACKGROUND ART

In a vehicle such as an automobile, a transmission and a differential device are provided in a motive power transmission path from a drive source such as an engine to drive wheels, and motive power from the drive source is transmitted to a drive shaft extending from the differential device in a vehicle width direction via the transmission and the differential device and is transmitted from the drive shaft to the drive wheels.

In a vehicle including a longitudinal placement type transmission for a front-engine/rear-drive vehicle, an engine and the transmission are arranged in a vehicle-body front portion, and motive power from the engine is transmitted from the transmission to a rear-wheel differential device arranged in a vehicle-body rear portion through a propeller shaft and is transmitted to rear wheels via a drive shaft.

Further, in a vehicle including a longitudinal placement type transmission for a front-engine/rear-drive based four-wheel drive vehicle, a transfer device is provided which distributes motive power from an engine, which is output from the transmission, also to front wheels, and the motive power from the engine is transmitted from the transfer device to a front-wheel differential device arranged in a vehicle-body front portion through a propeller shaft for front wheels and is transmitted also to the front wheels via a drive shaft.

For example, JP2003-509263A discloses that in a vehicle including a longitudinal placement type transmission for a front-engine/rear-drive based four-wheel drive vehicle, a drive shaft extending in a vehicle width direction is arranged on a vehicle front side of a transmission such as a continuously variable transmission arranged in a vehicle-body front portion and on a vehicle rear side of a starting clutch.

SUMMARY OF INVENTION

Problem to be Solved by the Invention

There may be a case where in a vehicle such as a sports type front-engine/rear-drive vehicle, a drive source such as an engine is arranged in a vehicle-body front portion, and a longitudinal placement type transmission is arranged in the vicinity of a drive shaft in a vehicle-body rear portion for the purpose of an increase in weight of the vehicle-body rear portion or the like. In such a case, motive power is transmitted from the drive source to the transmission via a propeller shaft, and the motive power is transmitted from the transmission to drive wheels arranged in the vehicle-body rear portion via a differential device and the drive shaft which are arranged in the vehicle-body rear portion.

In this vehicle, in a case where the transmission arranged in the vehicle-body rear portion is arranged on a vehicle front side of the drive shaft, a vehicle cabin space becomes narrow, and the comfort of an occupant might thereby be lowered. To address this, although it is possible to arrange the transmission on a vehicle rear side of the drive shaft, an overhang on the vehicle rear side becomes large and may cause lowering of operation stability.

Accordingly, an object of the present disclosure is to provide a motive power transmission device for a vehicle that can achieve both comfort of an occupant and operation stability in a case where a transmission is arranged in the vicinity of a drive shaft in a vehicle-body rear portion in a vehicle including a longitudinal placement type transmission.

Means for Solving the Problem

The present disclosure provides a motive power transmission device for a vehicle, including: a transmission that outputs motive power input from a drive source while performing gear-shifting for the motive power; and a drive shaft that is coupled with the transmission and transmits the motive power from the drive source, which is output from the transmission, to a drive wheel. The transmission has a transmission mechanism unit that is arranged in a transmission casing such that an axis line thereof extends in a vehicle front-rear direction and that performs gear-shifting for the motive power from the drive source, and the drive shaft extends in a vehicle width direction on a central side of the transmission mechanism unit in the vehicle front-rear direction and is provided such that the drive shaft passes through the transmission casing.

According to the present disclosure, in a case where a transmission is arranged in the vicinity of a drive shaft in a vehicle-body rear portion in a vehicle including a longitudinal placement type transmission, because the drive shaft extends in the vehicle width direction on a central side of the transmission mechanism unit in the vehicle front-rear direction such that the drive shaft passes through the transmission casing, lowering of the comfort of an occupant due to narrowing of a vehicle cabin space by the transmission can be inhibited compared to a case where the transmission is arranged on a vehicle front side of the drive shaft. Further, lowering of operation stability due to enlargement of an overhang on a vehicle rear side can be inhibited compared to a case where the transmission is arranged on the vehicle rear side of the drive shaft.

Consequently, in a case where the transmission is arranged in the vicinity of the drive shaft in the vehicle-body rear portion in the vehicle including the longitudinal placement type transmission, both comfort of an occupant and operation stability can be achieved.

The drive shaft preferably extends in the vehicle width direction on a central side of the transmission mechanism unit in a vehicle up-down direction.

With this configuration, because the drive shaft extends in the vehicle width direction on a central side of the transmission mechanism unit in the vehicle up-down direction, the position of the center of gravity of the vehicle is lowered compared to a case where the transmission is arranged above the drive shaft, and operation stability can thereby be improved. Further, compared to a case where the transmission is arranged below the drive shaft, a gap from the ground surface is increased, and ground clearance can thereby be secured.

The transmission mechanism unit preferably includes an input shaft and an output shaft that are arranged on the same axis line, a counter shaft that is arranged in parallel with the input shaft and the output shaft, and a transmission gear unit that has a plurality of gear trains, each of which is formed with a first gear provided to the input shaft or the output shaft and a second gear provided to the counter shaft and meshing with the first gear, and the drive shaft preferably extends in the vehicle width direction in a position, in the vehicle front-rear direction, corresponding to a predetermined gear train of which the first gear and the second gear have small dimensions in an up-down direction among the plurality of gear trains.

With this configuration, because the drive shaft extends in the vehicle width direction in a position, in the vehicle front-rear direction, corresponding to the predetermined gear train of which the first gear and the second gear have small dimensions in the up-down direction among the plurality of gear trains, the drive shaft is arranged close to the axis line of the transmission mechanism unit, and the transmission and the drive shaft can thereby be arranged compactly in the vehicle up-down direction.

The transmission mechanism unit preferably includes an input shaft and an output shaft that are arranged on the same axis line, a counter shaft that is arranged in parallel with the input shaft and the output shaft, a transmission gear unit that has a plurality of gear trains, each of which is formed with a first gear provided to the input shaft or the output shaft and a second gear provided to the counter shaft and meshing with the first gear, and a transmission gear operation unit that operates the transmission gear unit, and the drive shaft preferably extends in the vehicle width direction through a portion between the transmission gear unit and the transmission gear operation unit.

With this configuration, the drive shaft extends in the vehicle width direction through a portion between the transmission gear unit and the transmission gear operation unit. Thus, compared to a case where the drive shaft extends in the vehicle width direction through a portion in the transmission gear unit and a portion in the transmission gear operation unit, the drive shaft can be arranged with high assemblability between the transmission gear unit and the transmission gear operation unit that are dispersedly arranged in the vehicle up-down direction. The drive shaft and the transmission can thereby be arranged with high assemblability.

The motive power transmission device for a vehicle includes a differential device that is coupled with the transmission and coupled with the drive shaft and transmits the motive power from the drive source, which is output from the transmission, to the drive shaft.

With this configuration, in a vehicle including a differential device that is coupled with a longitudinal placement type transmission and coupled with a drive shaft, the drive shaft extends in the vehicle width direction on a central side of the transmission mechanism unit in the vehicle front-rear direction such that the drive shaft passes through the transmission casing, and both comfort of an occupant and operation stability can thereby be achieved.

The motive power transmission device for a vehicle preferably includes a differential housing in which the differential device is housed, and the differential housing is preferably integrally formed with the transmission casing.

With this configuration, because the differential housing is integrally formed with the transmission casing, compared to a case where the differential housing is arranged in the vehicle width direction without being integrally formed with the transmission casing, the differential housing and the transmission casing can compactly be formed.

Advantageous Effect of Invention

According to the present disclosure, in a case where a transmission is arranged in the vicinity of a drive shaft in a vehicle-body rear portion in a vehicle including a longitudinal placement type transmission, both comfort of an occupant and operation stability can be achieved.

DETAILED DESCRIPTION

An embodiment of the present disclosure will hereinafter be described with reference to the attached drawings.

Figure 1:
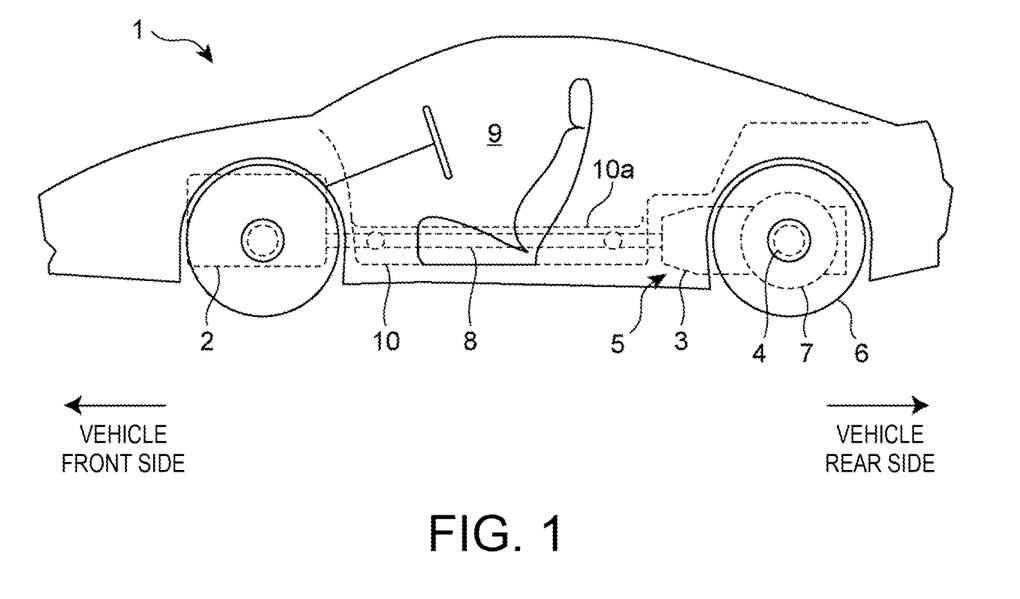
FIG. 1 is a schematic diagram of a vehicle including a motive power transmission device according to an embodiment of the present disclosure.

FIG. 1 is a schematic diagram of a vehicle including a motive power transmission device according to the embodiment of the present disclosure. As illustrated in FIG. 1, a vehicle 1 is a vehicle as a front-engine/rear-drive vehicle of a sports type or the like in which a seated position of a driver seat is low and the position of the center of gravity is low, an engine 2 as a drive source is arranged in a vehicle-body front portion, and a longitudinal placement type transmission 3 is arranged in the vicinity of a drive shaft 4 extending in a vehicle width direction in a vehicle-body rear portion.

A motive power transmission device 5 according to the present embodiment includes, in a motive power transmission path from the engine 2 to rear wheels 6 as drive wheels, the transmission 3 outputting motive power input from the engine 2 while performing gear-shifting for the motive power and the drive shaft 4 coupled with the transmission 3 and transmitting the motive power from the engine 2, which is output from the transmission 3, to the rear wheels 6 in the vehicle-body rear portion and includes a differential device 7 coupled with the transmission 3, coupled with the drive shaft 4, and transmitting the motive power from the engine 2, which is output from the transmission 3, to the drive shaft 4.

The motive power from the engine 2 is transmitted to the transmission 3 via a propeller shaft 8 extending in a vehicle front-rear direction and is transmitted from the transmission 3 to left and right rear wheels 6 via the differential device 7 and the drive shaft 4.

In the vehicle 1, a tunnel portion 10a bulging to a vehicle upper side is formed to extend in the vehicle front-rear direction on a central side, in the vehicle width direction, of a floor panel 10 configuring a bottom surface of a vehicle cabin 9, and the propeller shaft 8 is arranged in a space on the inside of the tunnel portion 10a. A vehicle front side of the transmission 3 to be coupled with the propeller shaft 8 is also arranged in the tunnel portion 10a.

Figure 2:
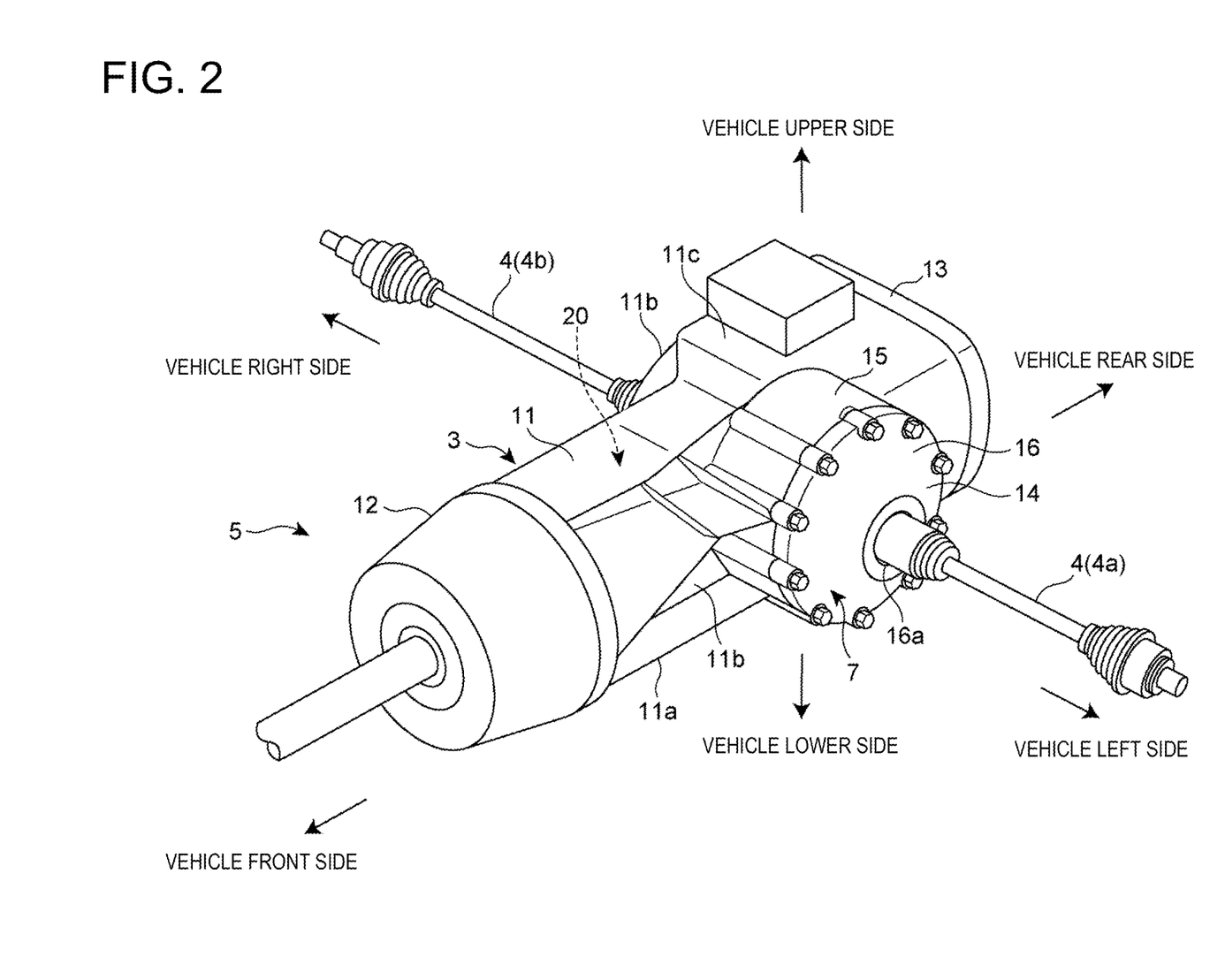
FIG. 2 is a perspective view of the motive power transmission device.

FIG. 2 is a perspective view of the motive power transmission device. As illustrated in FIG. 2, the transmission 3 is arranged in the vicinity of the drive shaft 4. As described later, the transmission 3 has a transmission mechanism unit 20 which is arranged in a transmission casing 11 such that its axis line extends in the vehicle front-rear direction and which performs gear-shifting for the motive power from the engine 2. The transmission casing 11 is formed in a generally tubular shape and extends in the vehicle front-rear direction, a vehicle front side thereof is covered by a front-side housing 12, and a vehicle rear side thereof is covered by a rear-side housing 13.

The differential device 7 is arranged on a vehicle left side as one vehicle-width-direction side of the transmission 3. The drive shaft 4 respectively extending to both sides in the vehicle width direction is coupled with the differential device 7. A differential housing 14 in which the differential device 7 is housed is arranged on the vehicle left side of the transmission casing 11 and is integrally formed with the transmission casing 11.

The differential housing 14 includes a first housing 15 which configures a vehicle right side as the other vehicle-width-direction side of the differential housing 14 and houses a vehicle right side of the differential device 7 and a second housing 16 which configures a vehicle left side of the differential housing 14 and houses a vehicle left side of the differential device 7.

The first housing 15 is integrally molded with the transmission casing 11, the second housing 16 is fixed to the first housing 15 by using fastening bolts, and the differential housing 14 is thereby integrally formed with the transmission casing 11. The second housing 16 is provided with a shaft insertion portion 16a through which a drive shaft 4a extending from the differential device 7 to a vehicle left side is inserted.

Figure 8:
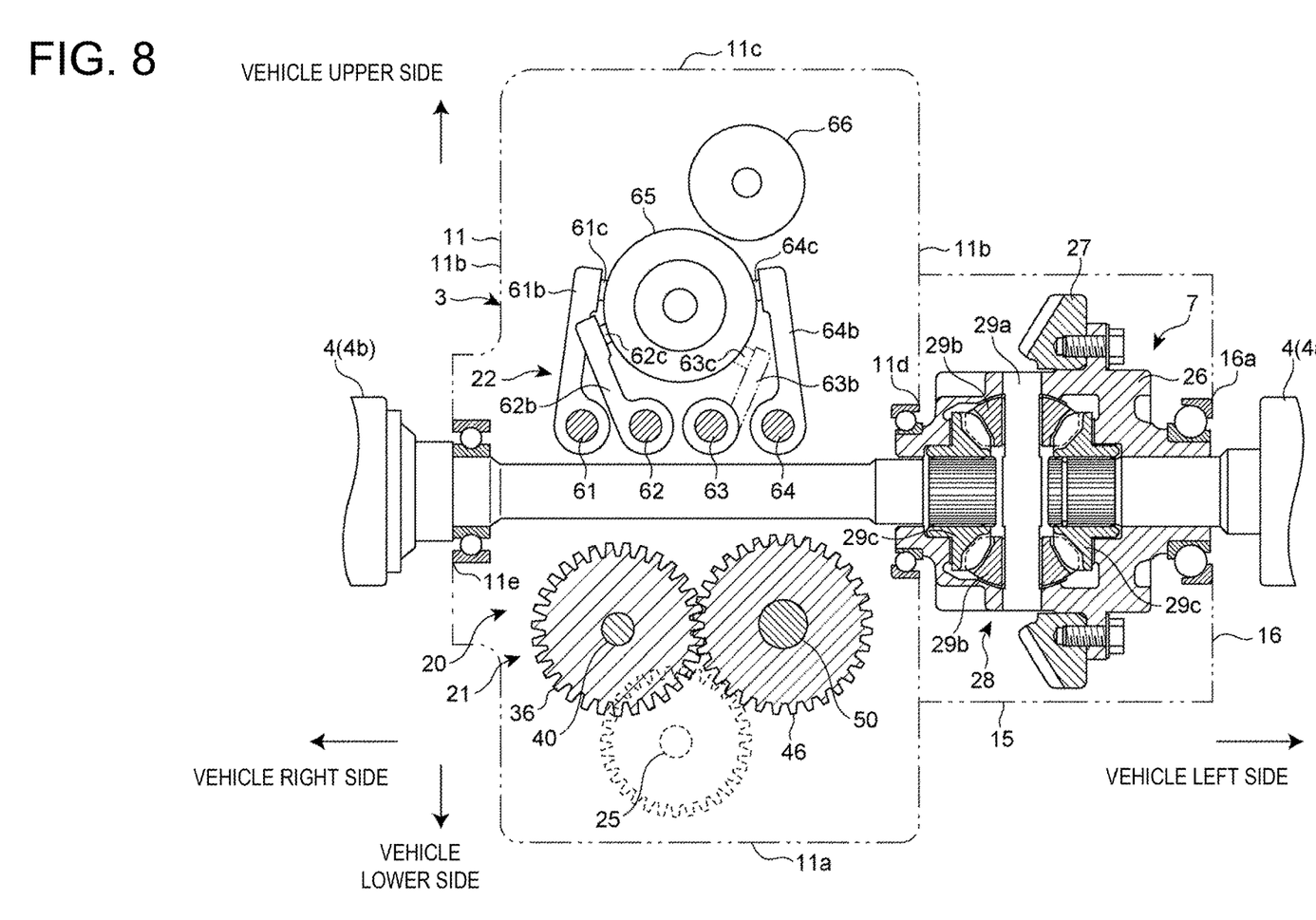
FIG. 8 is a cross-sectional view of principal components of the transmission, the differential device, and the drive shaft along line VIII-VIII in FIG. 5.

The transmission casing 11 includes a bottom surface portion 11a, side face portions 11b on both sides in the vehicle width direction, and a top face portion 11c. As illustrated in FIG. 8, the side face portion 11b on the vehicle left side is integrally formed with the first housing 15 and is provided with a shaft insertion portion 11d through which a drive shaft 4b extending from the differential device 7 to a vehicle right side is inserted. The side face portion 11b on the vehicle right side is also provided with a shaft insertion portion 11e through which the drive shaft 4b is inserted. The drive shaft 4b passes through the transmission casing 11 through the shaft insertion portions 11d and 11e and extends in the vehicle width direction.

Figure 3:
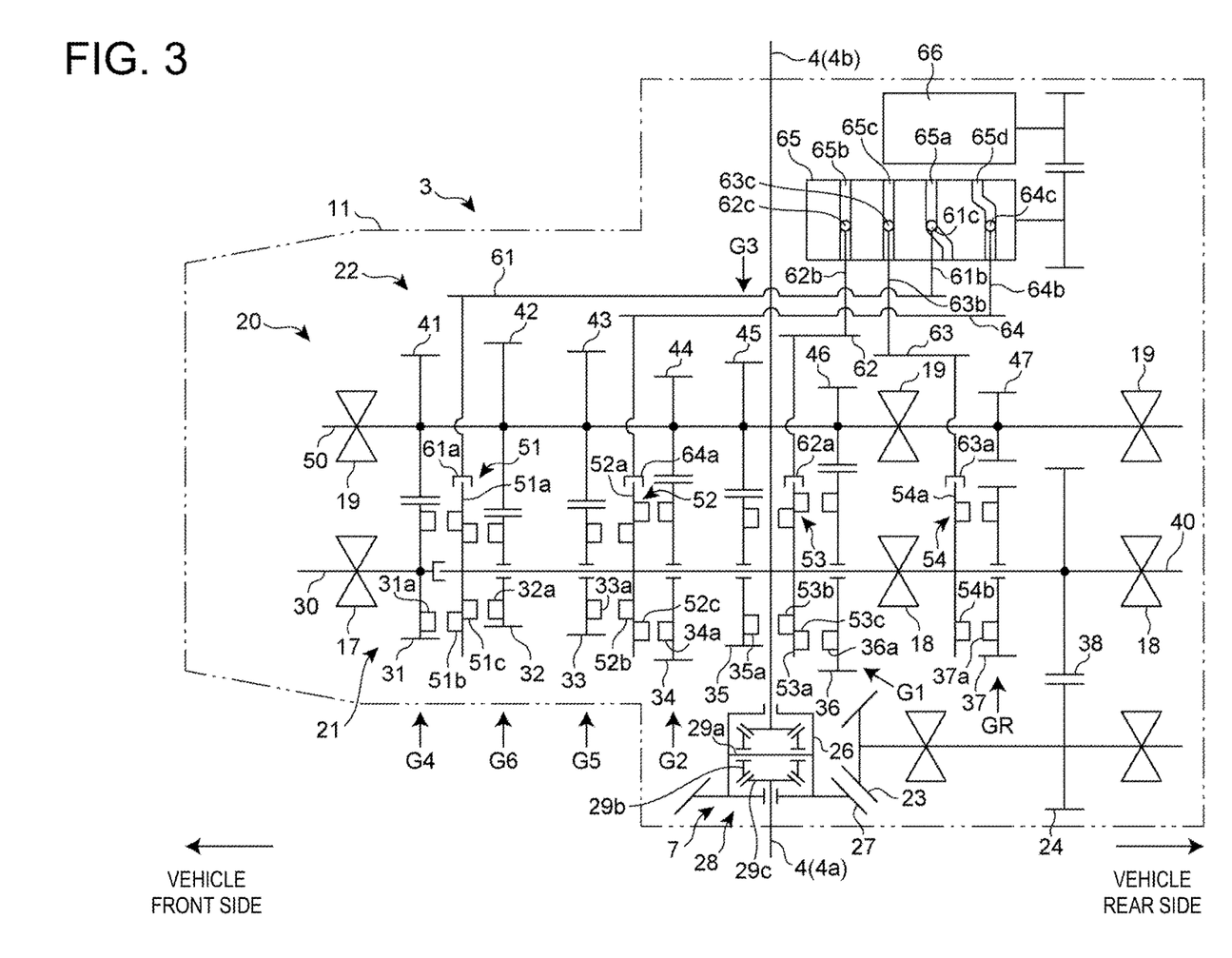
FIG. 3 is a skeleton diagram of the motive power transmission device.

FIG. 3 is a skeleton diagram of the motive power transmission device. As illustrated in FIG. 3, the transmission 3 is configured to be capable of achieving six forward speeds and one reverse speed. The transmission 3 has the transmission mechanism unit 20 which performs gear-shifting for the motive power from the engine 2.

The transmission mechanism unit 20 includes, in the transmission casing 11, an input shaft 30 to which an output from the engine 2 is input via a clutch (not illustrated), an output shaft 40 which is arranged on the same axis line as the input shaft 30 and outputs the motive power from the engine 2, and a counter shaft 50 arranged in parallel with the input shaft 30 and the output shaft 40. The input shaft 30, the output shaft 40, and the counter shaft 50 are arranged such that their axis lines extend in the vehicle front-rear direction.

The input shaft 30 is rotatably supported by the transmission casing 11 via a bearing 17. The output shaft 40 is rotatably supported by the transmission casing 11 via a bearing 18. A rear end portion of the input shaft 30 is rotatably fitted on a front end portion of the output shaft 40. The counter shaft 50 is rotatably supported by the transmission casing 11 via a bearing 19.

A driving gear 31 for a fourth speed stage is fixedly provided to a vehicle front side of the input shaft 30. On the output shaft 40, in order from the vehicle front side, a driven gear 32 for a sixth speed stage, a driven gear 33 for a fifth speed stage, a driven gear 34 for a second speed stage, a driven gear 35 for a third speed stage, a driven gear 36 for a first speed stage, and a driven gear 37 for a reverse speed stage are loosely fit.

To the counter shaft 50, in order from the vehicle front side, a driven gear 41 for the fourth speed stage, a driving gear 42 for the sixth speed stage, a driving gear 43 for the fifth speed stage, a driving gear 44 for the second speed stage, a driving gear 45 for the third speed stage, a driving gear 46 for the first speed stage, and a driving gear 47 for the reverse speed stage are fixedly provided.

A gear train G4 for the fourth speed stage is configured with the driving gear 31 for the fourth speed and the driven gear 41 for the fourth speed stage which always meshes with the driving gear 31 for the fourth speed stage. When a shift lever is operated to a fourth speed, the input shaft 30 and the output shaft 40 are directly coupled together, and the fourth speed is thereby achieved. The gear train G4 for the fourth speed stage functions as a reduction gear train which transmits rotation of the input shaft 30 to the counter shaft 50 while reducing the speed of the rotation at a specific reduction ratio.

Further, a gear train G1 for the first speed stage, a gear train G2 for the second speed stage, a gear train G3 for the third speed stage, a gear train G5 for the fifth speed stage, and a gear train G6 for the sixth speed stage are respectively configured with: the driven gear 36 for the first speed stage, the driven gear 34 for the second speed stage, the driven gear 35 for the third speed stage, the driven gear 33 for the fifth speed stage, and the driven gear 32 for the sixth speed stage; and the driving gear 46 for the first speed stage, the driving gear 44 for the second speed stage, the driving gear 45 for the third speed stage, the driving gear 43 for the fifth speed stage, and the driving gear 42 for the sixth speed stage which always respectively mesh with the driven gear 36 for the first speed stage, the driven gear 34 for the second speed stage, the driven gear 35 for the third speed stage, the driven gear 33 for the fifth speed stage, and the driven gear 32 for the sixth speed stage.

As for the driving gear 31 for the fourth speed stage which is provided to the input shaft 30, the driven gear 36 for the first speed stage, the driven gear 34 for the second speed stage, the driven gear 35 for the third speed stage, the driven gear 33 for the fifth speed stage, and the driven gear 32 for the sixth speed stage which are provided to the output shaft 40, a gear diameter as an outer diameter of a gear is formed smaller as a shift stage becomes higher.

As for the driving gear 46 for the first speed stage, the driving gear 44 for the second speed stage, the driving gear 45 for the third speed stage, the driven gear 41 for the fourth speed stage, the driving gear 43 for the fifth speed stage, and the driving gear 42 for the sixth speed stage which are provided to the counter shaft 50, the gear diameter is formed larger as the shift stage becomes higher.

In the transmission 3, as for the gear train G3 for the third speed stage and the gear train G4 for the fourth speed stage as gear trains for intermediate speed stages among the gear train G1 for the first speed stage to the gear train G6 for the sixth speed stage, their maximum gear diameters among the gear diameters of sets of two gears configuring the gear trains are formed to be small compared to the gear train G1 for the first speed stage and the gear train G2 for the second speed stage as gear trains for low speed stages and the gear train G5 for the fifth speed stage and the gear train G6 for the sixth speed stage as gear trains for high speed stages. Among the gear train G1 for the first speed stage to the gear train G6 for the sixth speed stage, as for the gear train G3 for the third speed stage, its maximum gear diameters are formed to be smallest among the gear diameters of sets of two gears configuring the gear trains.

The driven gear 37 for the reverse speed stage and the driving gear 47 for the reverse speed stage do not mesh with each other but always mesh with an idler gear for the reverse speed stage which is loosely fitted on a reverse shaft disposed in parallel with the input shaft 30, the output shaft 40, and the counter shaft 50 in the transmission casing 11. A gear train GR for the reverse speed stage is configured with the driven gear 37 for the reverse speed stage, the driving gear 47 for the reverse speed stage, and the idler gear for the reverse speed stage.

The transmission mechanism unit 20 includes a transmission gear unit 21 having a plurality of gear trains, each of which is formed with a first gear provided to the input shaft 30 or the output shaft 40 and a second gear provided to the counter shaft 50 and meshing with the first gear. The driven gear 36 for the first speed stage, the driven gear 34 for the second speed stage, the driven gear 35 for the third speed stage, the driving gear 31 for the fourth speed stage, the driven gear 33 for the fifth speed stage, and the driven gear 32 for the sixth speed stage configure first gears. The driving gear 46 for the first speed stage, the driving gear 44 for the second speed stage, the driving gear 45 for the third speed stage, the driven gear 41 for the fourth speed stage, the driving gear 43 for the fifth speed stage, and the driving gear 42 for the sixth speed stage configure second gears. The gear train G1 for the first speed stage to the gear train G6 for the sixth speed stage configure a plurality of gear trains G1 to G6, each of which is formed with the first gear and the second gear.

In addition, a first dog clutch 51 is provided on a vehicle front side of the driven gear 32 for the sixth speed stage, a second dog clutch 52 is provided between the driven gear 33 for the fifth speed stage and the driven gear 34 for the second speed stage, a third dog clutch 53 is provided between the driven gear 35 for the third speed stage and the driven gear 36 for the first speed stage, and a fourth dog clutch 54 is provided on a vehicle front side of the driven gear 37 for the reverse speed stage. The dog clutches 51, 52, 53, and 54 are formed generally similarly.

The first dog clutch 51 has a disk-shaped clutch ring 51a which is coupled with the output shaft 40 to be incapable of relative rotation thereto and provided to be capable of relative movement in an axis line direction of the output shaft 40. A plurality of clutch teeth 51b protruding in the axis line direction of the output shaft 40 are provided on a surface of the clutch ring 51a on the vehicle front side. The plurality of clutch teeth 51b radially extend in radial directions of the output shaft 40 and are arranged at equivalent intervals in a circumferential direction of the output shaft 40.

The driving gear 31 for the fourth speed stage is provided with a plurality of clutch teeth 31a which protrude in the axis line direction of the output shaft 40 while corresponding to the plurality of clutch teeth 51b of the clutch ring 51a. The plurality of clutch teeth 31a radially extend in the radial directions of the output shaft 40 and are arranged at equivalent intervals in the circumferential direction of the output shaft 40.

The clutch teeth 51b and the clutch teeth 31a are formed to be engaged together when the clutch ring 51a is moved toward the driving gear 31 for the fourth speed stage. When the clutch teeth 51b and the clutch teeth 31a are engaged together and the clutch ring 51a is engaged with the driving gear 31 for the fourth speed stage, the input shaft 30 and the output shaft 40 are directly coupled together, and rotation of the input shaft 30 is transmitted to the output shaft 40.

A plurality of clutch teeth 51c protruding in the axis line direction of the output shaft 40 are provided on a surface of the clutch ring 51a on the vehicle rear side, and the plurality of clutch teeth 51c radially extend in the radial directions of the output shaft 40 and are arranged at equivalent intervals in the circumferential direction of the output shaft 40.

The driven gear 32 for the sixth speed stage is provided with a plurality of clutch teeth 32a which protrude in the axis line direction of the output shaft 40 while corresponding to the plurality of clutch teeth 51c of the clutch ring 51a, and the plurality of clutch teeth 32a radially extend in the radial directions of the output shaft 40 and are arranged at equivalent intervals in the circumferential direction of the output shaft 40.

The clutch teeth 51c and the clutch teeth 32a are formed to be engaged together when the clutch ring 51a is moved toward the driven gear 32 for the sixth speed stage. When the clutch teeth 51c and the clutch teeth 32a are engaged together and the clutch ring 51a is engaged with the driven gear 32 for the sixth speed stage, the gear train G6 for the sixth speed stage is set to a motive power transmission state. The driven gear 32 for the sixth speed stage and the output shaft 40 are coupled together, and rotation of the input shaft 30 is transmitted to the counter shaft 50 by the gear train G4 for a speed reduction stage and is transmitted to the output shaft 40 by the gear train G6 for the sixth speed stage.

In the second dog clutch 52, plurality of clutch teeth 52b are provided to a surface of a clutch ring 52a on the vehicle front side, and plurality of clutch teeth 52c are provided to a surface on the vehicle rear side.

The driven gear 33 for the fifth speed stage is provided with a plurality of clutch teeth 33a which correspond to the plurality of clutch teeth 52b of the clutch ring 52a. The driven gear 34 for the second speed stage is provided with a plurality of clutch teeth 34a which correspond to the plurality of clutch teeth 52c of the clutch ring 52a.

The clutch teeth 52b and the clutch teeth 33a are formed to be engaged together when the clutch ring 52a is moved toward the driven gear 33 for the fifth speed stage. The clutch teeth 52c and the clutch teeth 34a are formed to be engaged together when the clutch ring 52a is moved toward the driven gear 34 for the second speed stage.

When the clutch ring 52a is engaged with the driven gear 33 for the fifth speed stage, the gear train G5 for the fifth speed stage is set to the motive power transmission state, and rotation of the input shaft 30 is transmitted to the output shaft 40 via the gears G4 for the speed reduction stage and the gear train G6 for the sixth speed stage. When the clutch ring 52a is engaged with the driven gear 34 for the second speed stage, the gear train G2 for the second speed stage is set to the motive power transmission state, and rotation of the input shaft 30 is transmitted to the output shaft 40 via the gears G4 for the speed reduction stage and the gear train G2 for the second speed stage.

In the third dog clutch 53, plurality of clutch teeth 53b are provided to a surface of a clutch ring 53a on the vehicle front side, and plurality of clutch teeth 53c are provided to a surface on the vehicle rear side.

The driven gear 35 for the third speed stage is provided with a plurality of clutch teeth 35a which correspond to the plurality of clutch teeth 53b of the clutch ring 53a. The driven gear 36 for the first speed stage is provided with a plurality of clutch teeth 36a which correspond to the plurality of clutch teeth 53c of the clutch ring 53a.

The clutch teeth 53b and the clutch teeth 35a are formed to be engaged together when the clutch ring 53a is moved toward the driven gear 35 for the third speed stage. The clutch teeth 53c and the clutch teeth 36a are formed to be engaged together when the clutch ring 53a is moved toward the driven gear 36 for the first speed stage.

When the clutch ring 53a is engaged with the driven gear 35 for the third speed stage, the gear train G3 for the third speed stage is set to the motive power transmission state, and rotation of the input shaft 30 is transmitted to the output shaft 40 via the gears G4 for the speed reduction stage and the gear train G3 for the third speed stage. When the clutch ring 53a is engaged with the driven gear 36 for the first speed stage, the gear train G1 for the first speed stage is set to the motive power transmission state, and rotation of the input shaft 30 is transmitted to the output shaft 40 via the gears G4 for the speed reduction stage and the gear train G1 for the first speed stage.

In the fourth dog clutch 54, a plurality of clutch teeth 54b are provided to a surface of a clutch ring 54a on the vehicle front side. The driven gear 37 for the reverse speed stage is provided with a plurality of clutch teeth 37a which correspond to the plurality of clutch teeth 54b of the clutch ring 54a. The clutch teeth 54b and the clutch teeth 37a are formed to be engaged together when the clutch ring 54a is moved toward the driven gear 37 for the reverse speed stage.

When the clutch ring 54a is engaged with the driven gear 37 for the reverse speed stage, the gear train GR for the reverse speed stage is set to the motive power transmission state, and rotation of the input shaft 30 is transmitted to the output shaft 40 via the gears G4 for the speed reduction stage and the gear train GR for the reverse speed stage.

The transmission mechanism unit 20 further includes a transmission gear operation unit 22 for operating the transmission gear unit 21. The transmission gear operation unit 22 includes a plurality of shift rods 61, 62, 63, and 64 linearly extending in the vehicle front-rear direction, and the plurality of shift rods 61, 62, 63, and 64 respectively support a plurality of shift forks 61a, 62a, 63a, and 64a and are arranged in parallel with each other.

The transmission 3 includes, in order from the vehicle left side, the first shift rod 61, the second shift rod 62, the third shift rod 63, and the fourth shift rod 64. The first shift rod 61, the second shift rod 62, the third shift rod 63, and the fourth shift rod 64 respectively support the first shift fork 61a, the second shift fork 62a, the third shift fork 63a, and the fourth shift fork 64a which are respectively engaged with the clutch rings 51a, 53a, 54a, and 52a.

Outer peripheral portions of the clutch rings 51a, 53a, 54a, and 52a are respectively accommodated in recesses provided to distal end portions of the shift forks 61a, 63a, 64a, and 62a, and the clutch rings 51a, 53a, 54a, and 52a are respectively moved in the axis line direction of the output shaft 40 by movement of the shift forks 61a, 63a, 64a, and 62a.

The transmission gear operation unit 22 further includes a shift drum 65 which has shift grooves 65a, 65b, 65c, and 65d corresponding to the shift rods 61, 62, 63, and 64 and a motor 66 as an actuator which causes the shift drum 65 to be driven to rotate and causes the plurality of shift rods 61, 62, 63, and 64 to be operated to move.

The shift drum 65 is formed in a cylindrical shape, and in its outer peripheral surface, the first shift groove 65a, the second shift groove 65b, the third shift groove 65c, and the fourth shift groove 65d are formed while corresponding to the first shift rod 61, the second shift rod 62, the third shift rod 63, and the fourth shift rod 64.

Projection portions 61c, 62c, 63c, and 64c are respectively engaged with the first shift groove 65a, the second shift groove 65b, the third shift groove 65c, and the fourth shift groove 65d, the projection portions 61c, 62c, 63c, and 64c being provided to distal end portions of a first shift arm 61b, a second shift arm 62b, a third shift arm 63b, and a fourth shift arm 64b which are respectively fixed to and supported by the first shift rod 61, the second shift rod 62, the third shift rod 63, and the fourth shift rod 64.

The motor 66 causes the shift drum 65 to be driven to rotate based on an operation of the shift lever and thereby causes the plurality of shift rods 61, 62, 63, and 64 to be operated to move. When the shift drum 65 is driven to rotate by the motor 66, the shift rods 61, 62, 63, and 64 are selectively operated to move in the axis line direction via the shift arms 61b, 62b, 63b, and 64b in accordance with the shift grooves 65a, 65b, 65c, and 65d.

Then, the shift forks 61a, 62a, 63a, and 64a supported by the shift rods 61, 62, 63, and 64 are moved, and the dog clutches 51, 53, 54, and 52 are selectively operated. Accordingly, changes such as shift-up, shift-down, and reverse are performed by an operation of the shift lever, and six forward speeds and one reverse speed are thereby achieved.

In the transmission 3, on the output shaft 40, an output gear 38 is fixedly provided to a vehicle rear side of the driven gear 37 for the reverse speed stage, and the output gear 38 meshes with an input gear 24 fixedly provided to a vehicle rear side of a drive pinion 23 extending in the vehicle front-rear direction. The drive pinion 23 is rotatably supported by the transmission casing 11. The motive power from the engine 2 which is output from the transmission 3 is transmitted to the differential device 7 via the drive pinion 23.

The differential device 7 has a differential casing 26 rotatably supported by the differential housing 14 and a ring gear 27 fixed to the differential casing 26. The ring gear 27 meshes with the drive pinion 23 and is arranged on the vehicle left side of the drive pinion 23.

The differential device 7 further has a differential mechanism 28. The differential mechanism 28 has a pinion shaft 29a fixed to the differential casing 26 and extending in a direction orthogonal to the vehicle width direction, a pair of pinion gears 29b which are rotatably fitted on the pinion shaft 29a and are opposed to each other, and a pair of left and right side gears 29c meshing with the pair of pinion gears 29b.

The drive shaft 4 extending in the vehicle width direction is spline-fitted in the pair of side gears 29c. The drive shaft 4 is, together with the side gears 29c, capable of relative rotation to the differential housing 14 and the differential casing 26. The left rear wheel 6 is coupled with the drive shaft 4a, and the right rear wheel 6 is coupled with the drive shaft 4b.

The differential device 7 is coupled with the transmission 3 and also coupled with the drive shaft 4 and transmits the motive power from the engine 2, which is output from the transmission 3, to the drive shaft 4, and the drive shaft 4 is coupled with the transmission 3 via the drive pinion 23 and the differential device 7 and transmits the motive power from the engine 2, which is output from the transmission 3, to the rear wheels 6.

In the present embodiment, the drive shaft 4 extends in the vehicle width direction on a central side of the transmission mechanism unit 20 of the transmission 3 in the vehicle front-rear direction. The drive shaft 4 is arranged in a position, in the vehicle front-rear direction, overlapping with a portion, in the vehicle front-rear direction, in which the plurality of gear trains G1 to G6 of the transmission gear unit 21 are arranged. The drive shaft 4 also extends in the vehicle width direction in a position, in a vehicle up-down direction, overlapping with the transmission mechanism unit 20 on a central side of the transmission mechanism unit 20 of the transmission 3 in the vehicle up-down direction.

Next, the motive power transmission device according to the embodiment of the present disclosure will further be described with reference to FIG. 4 to FIG. 8.

Figure 4:
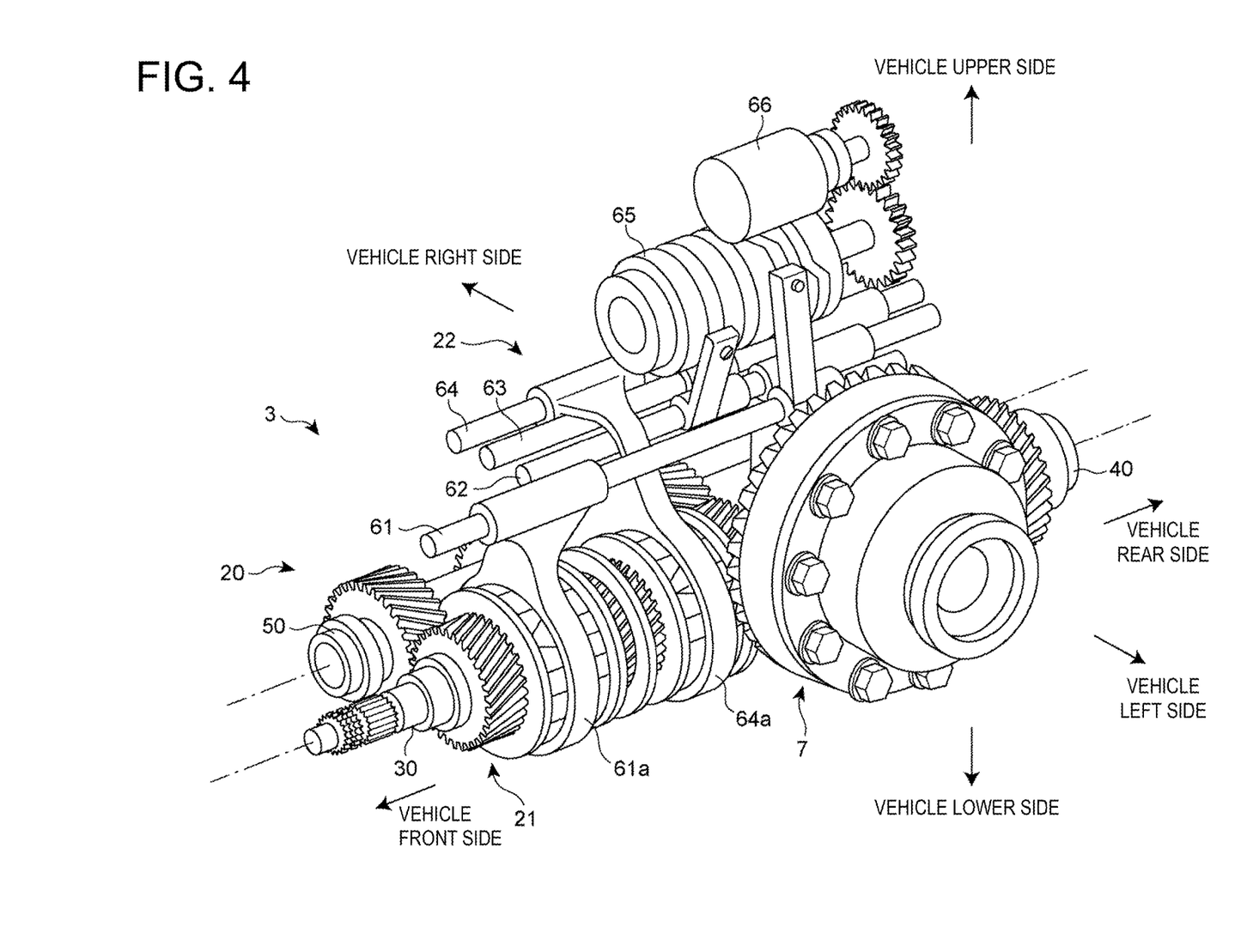
FIG. 4 is a perspective view of a transmission and a differential device.
Figure 5:
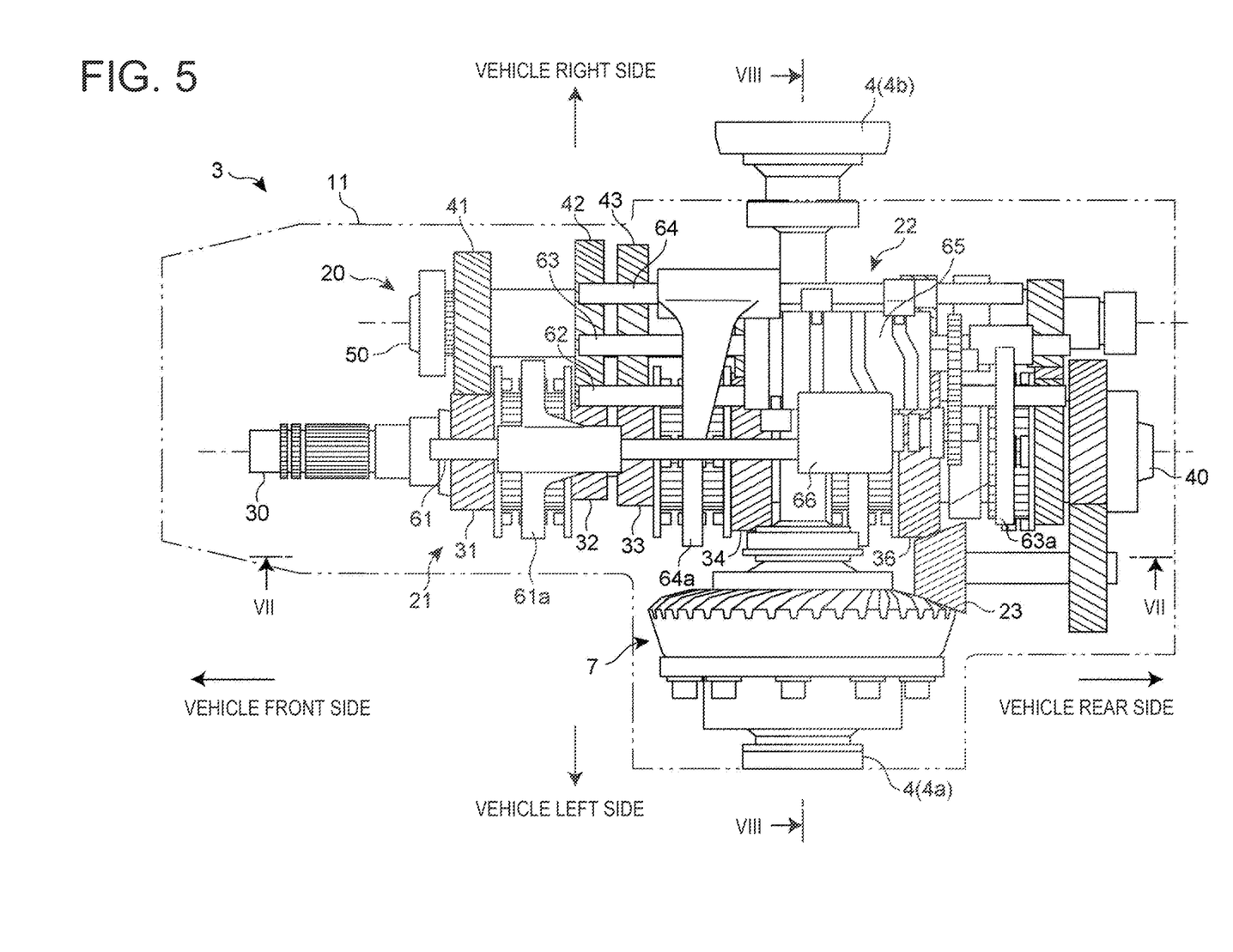
FIG. 5 is a top view of the transmission, the differential device, and a drive shaft.
Figure 6:
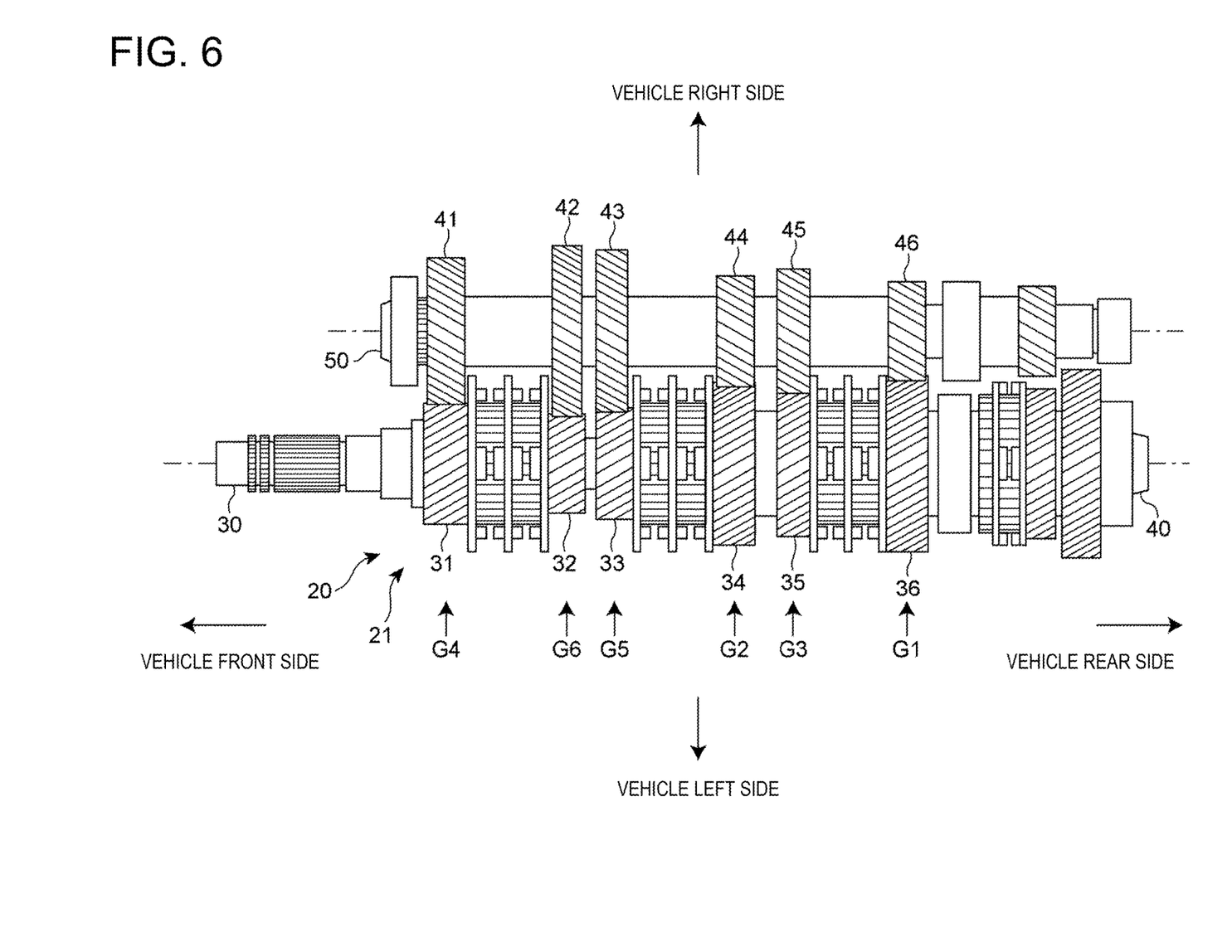
FIG. 6 is a top view of a transmission gear unit of the transmission.
Figure 7:
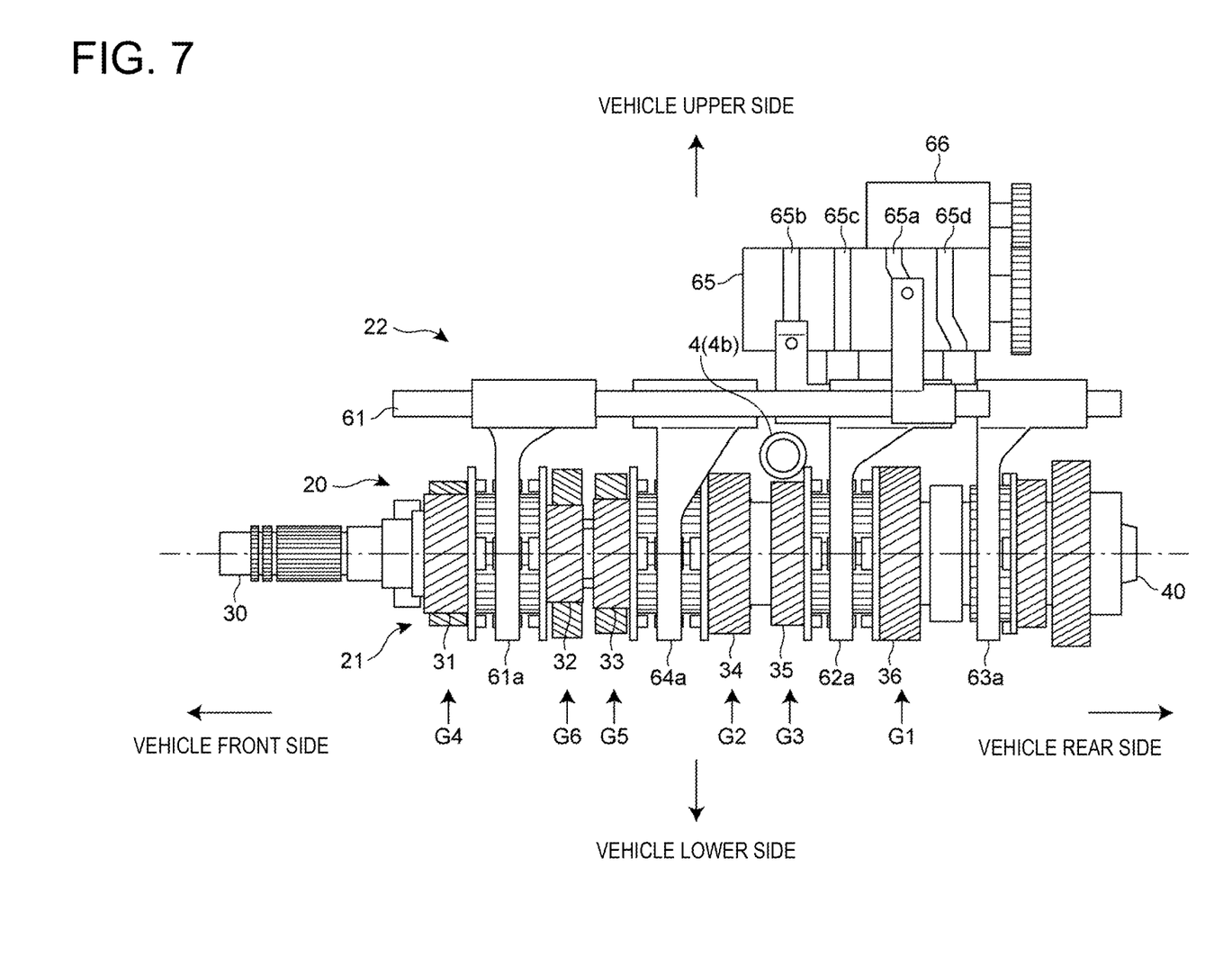
FIG. 7 is a side view of a transmission mechanism unit of the transmission as seen from a VII direction in FIG. 5.

FIG. 4 is a perspective view of the transmission and the differential device, FIG. 5 is a top view of the transmission, the differential device, and the drive shaft, FIG. 6 is a top view of the transmission gear unit of the transmission, FIG. 7 is a side view of the transmission gear operation unit of the transmission as seen from a VII direction in FIG. 5, and FIG. 8 is a cross-sectional view of principal components of the transmission, the differential device, and the drive shaft along line VIII-VIII in FIG. 5. FIG. 4 to FIG. 8 are drawings in which the transmission casing and the differential housing are removed. The drive shaft is illustrated in FIG. 7.

As illustrated in FIG. 4 to FIG. 8, the transmission 3 has the transmission mechanism unit 20 which is arranged in the vicinity of the drive shaft 4 and is arranged in the transmission casing 11 such that the axis line extends in the vehicle front-rear direction. The transmission mechanism unit 20 includes the input shaft 30, the output shaft 40, and the counter shaft 50, the transmission gear unit 21 having the plurality of gear trains G1 to G6 which are respectively formed with the first gears provided to the input shaft 30 or the output shaft 40 and the second gears provided to the counter shaft 50, and the transmission gear operation unit 22 for operating the transmission gear unit 21.

The differential device 7 is arranged on a vehicle left side of the transmission 3, the motive power from the engine 2 which is output from the transmission 3 is transmitted to the differential device 7 via the drive pinion 23 extending in the vehicle front-rear direction, and the differential device 7 transmits the transmitted motive power from the engine 2 to the drive shaft 4 extending in the vehicle width direction. The left and right drive shafts 4 respectively transmit the transmitted motive power from the engine 2 to the left and right rear wheels 6.

As illustrated in FIG. 6, in the transmission gear unit 21, the input shaft 30 and the output shaft 40 linearly extend in the vehicle front-rear direction. The counter shaft 50 linearly extends in the vehicle front-rear direction in parallel with the input shaft 30 and the output shaft 40. The input shaft 30, the output shaft 40, and the counter shaft 50 extend in the horizontal direction or a substantially horizontal direction.

As illustrated in FIG. 8, the input shaft 30, the output shaft 40, and the counter shaft 50 are separately arranged in the vehicle width direction and arranged in positions overlapping with each other in the vehicle up-down direction. A reverse shaft 25 linearly extends in the vehicle front-rear direction in parallel with the input shaft 30, the output shaft 40, and the counter shaft 50 and extends in the horizontal direction or a substantially horizontal direction below the input shaft 30, the output shaft 40, and the counter shaft 50.

As illustrated in FIG. 6, the transmission gear unit 21 has, in order from the vehicle front side, the driving gear 31 for the fourth speed stage, the driven gear 32 for the sixth speed stage, the driven gear 33 for the fifth speed stage, the driven gear 34 for the second speed stage, the driven gear 35 for the third speed stage, and the driven gear 36 for the first speed stage as the first gears provided to the input shaft 30 or the output shaft 40 and has, in order from the vehicle front side, the driven gear 41 for the fourth speed stage, the driving gear 42 for the sixth speed stage, the driving gear 43 for the fifth speed stage, the driving gear 44 for the second speed stage, the driving gear 45 for the third speed stage, and the driving gear 46 for the first speed stage as the second gears provided to the counter shaft 50.

The first gears and the second gears constitute a plurality of respective gear trains G1 to G6 of, in order from the vehicle front side, the gear train G4 for the fourth speed stage, the gear train G6 for the sixth speed stage, the gear train G5 for the fifth speed stage, the gear train G2 for the second speed stage, the gear train G3 for the third speed stage, and the gear train G1 for the first speed stage.

Among the gear train G1 for the first speed stage to the gear train G6 for the sixth speed stage, as for the gear train G3 for the third speed stage, its maximum gear diameters are formed to be smallest among the gear diameters (the diameters of gears) of the first gears and second gears as sets of two gears configuring the gear trains, and the dimensions of the first gear and the second gear in the up-down direction are formed smallest.

As illustrated in FIG. 7, the drive shaft 4 is arranged on an upper side of the transmission gear unit 21 and extends in the vehicle width direction on a central side of the transmission mechanism unit 20 in the vehicle front-rear direction. The drive shaft 4 is arranged in a position, in the vehicle front-rear direction, overlapping with a portion, in the vehicle front-rear direction, in which the plurality of gear trains G1 to G6 of the transmission gear unit 21 are arranged and is preferably arranged on a central side, in the vehicle front-rear direction, of the portion in which the plurality of gear trains G1 to G6 are arranged. The drive shafts 4a and 4b linearly extend in the vehicle width direction which is orthogonal to the vehicle front-rear direction, and the drive shaft 4b on the vehicle right side extends in the vehicle width direction on a central side of the transmission mechanism unit 20 in the vehicle front-rear direction.

The drive shaft 4 extends in the vehicle width direction in a position, in the vehicle front-rear direction, corresponding to a predetermined gear train G3 of which the first gear and the second gear have the smallest dimensions in the up-down direction among the plurality of gear trains G1 to G6 of the transmission gear unit 21 and is arranged in a position overlapping with the predetermined gear train G3 in the vehicle front-rear direction. In the present embodiment, the drive shaft 4 extends in the vehicle width direction in a position, in the vehicle front-rear direction, corresponding to the gear train G3 for the third speed stage, that is, in a position overlapping with the gear train G3 in the vehicle front-rear direction.

In the present embodiment, although the drive shaft 4 is provided while corresponding to the gear train G3 for the third speed stage, in a case where the gear train G4 for the fourth speed stage is arranged on a central side of the transmission mechanism unit 20 in the vehicle front-rear direction, the drive shaft 4 may be provided in a position, in the vehicle front-rear direction, corresponding to the gear train G4 for the fourth speed stage. The drive shaft 4 is provided in a position, in the vehicle front-rear direction, corresponding to the gear trains G3 and G4 for the intermediate speed stages as predetermined gear trains of which the first gears and the second gears have small dimensions in the up-down direction.

In the transmission 3, the gear train G1 for the first speed stage and the gear train for the second speed stage are set as gear trains for the low speed stages, the gear train G5 for the fifth speed stage and the gear train G6 for the sixth speed stage are set as gear trains for the high speed stages, and the gear train G3 for the third speed stage and the gear train G4 for the fourth speed stage are set as gear trains for the intermediate speed stages.

In a case where the gear train for the first speed stage to the gear train for the fifth speed stage are set as gear trains for forward shift stages, the gear train for the first speed stage is set as the gear train for the low speed stage, the gear train for the fifth speed stage is set as a gear train for the high speed stage, the gear train for the second speed stage to the gear train for the fourth speed stage are set as gear trains for the intermediate speed stages, and the drive shaft 4 is provided in a position, in the vehicle front-rear direction, corresponding to the gear train for the second speed stage to the gear train for the fourth speed stage, which are the gear trains for the intermediate speed stages, as predetermined gear trains of which the first gears and the second gears have small dimensions in the up-down direction.

In a case where the plurality of gear trains that are at least three or more gear trains are provided as the gear trains for the forward shift stages, the drive shaft 4 is provided in a position, in the vehicle front-rear direction, corresponding to the gear train for the intermediate speed stage as the predetermined gear train of which the first gear and the second gear have small dimensions in the up-down direction and is preferably provided in a position, in the vehicle front-rear direction, corresponding to a predetermined gear train of which the first gear and the second gear have the smallest dimensions in the up-down direction.

As illustrated in FIG. 4, the transmission gear operation unit 22 is arranged on an upper side of the transmission gear unit 21. The transmission gear operation unit 22 includes the plurality of shift rods 61, 62, 63, and 64 which respectively support the plurality of shift forks 61a, 62a, 63a, and 64a and are arranged in parallel with each other, the shift drum 65 which has the shift grooves 65a, 65b, 65c, and 65d corresponding to the plurality of shift rods 61, 62, 63, and 64, and the motor 66 as the actuator which causes the shift drum 65 to be driven to rotate and causes the plurality of shift rods 61, 62, 63, and 64 to be operated to move.

As for the plurality of shift rods 61, 62, 63, and 64 of the transmission gear operation unit 22, specifically, the four shift rods 61, 62, 63, and 64 are arranged to extend in the vehicle front-rear direction above the drive shaft 4. Each of the shift rods 61, 62, 63, and 64 is arranged to linearly extend in the vehicle front-rear direction and to extend in the horizontal direction or a substantially horizontal direction above the input shaft 30, the output shaft 40, and the counter shaft 50.

As illustrated in FIG. 8, in order from the vehicle left side, the four shift rods 61, 62, 63, and 64, specifically, the first shift rod 61, the second shift rod 62, the third shift rod 63, and the fourth shift rod 64 are arranged separately in the vehicle width direction and in positions overlapping with each other in the vehicle up-down direction.

The shift forks 61a, 62a, 63a, and 64a respectively supported by the shift rods 61, 62, 63, and 64 extend downward from the shift rods 61, 62, 63, and 64 and extend in directions orthogonal to the vehicle front-rear direction. The plurality of shift forks 61a, 62a, 63a, and 64a are separately provided in the vehicle front-rear direction. In order from the vehicle front side, the first shift fork 61a, the fourth shift fork 64a, the second shift fork 62a, and the third shift fork 63a are separately provided in the vehicle front-rear direction.

The shift arms 61b, 62b, 63b, and 64b respectively supported by the shift rods 61, 62, 63, and 64 extend upward from the shift rods 61, 62, 63, and 64. The plurality of shift arms 61b, 62b, 63b, and 64b are separately provided in the vehicle front-rear direction, and the projection portions 61c, 62c, 63c, and 64c in the distal end portions of the shift arms 61b, 62b, 63b, and 64b are respectively engaged with the shift grooves 65a, 65b, 65c, and 65d of the shift drum 65.

As illustrated in FIG. 7, the shift drum 65 and the motor 66 are arranged above the plurality of shift rods 61, 62, 63, and 64 on a vehicle rear side of the transmission mechanism unit 20. Both the shift drum 65 and the motor 66 are arranged such that their axis line extends in the vehicle front-rear direction. The motor 66 is arranged above the shift drum 65.

As illustrated in FIG. 8, the drive shaft 4 extends in the vehicle width direction in a position, in the vehicle up-down direction, overlapping with the transmission mechanism unit 20 on a central side of the transmission mechanism unit 20 in the vehicle up-down direction. The drive shaft 4 extends in the vehicle width direction through a portion between the transmission gear unit 21 and the transmission gear operation unit 22 arranged on the upper side of the transmission gear unit 21, specifically, a portion between the transmission gear unit 21 and the plurality of shift rods 61, 62, 63, and 64 of the transmission gear operation unit 22. The drive shaft 4 can be arranged with high assemblability between the transmission gear unit 21 and the transmission gear operation unit 22 which are dispersedly arranged in the vehicle up-down direction.

As illustrated in FIG. 7, the drive shaft 4 extends in the vehicle width direction through a portion among the plurality of shift forks 61a, 62a, 63a, and 64a. In the transmission 3, the drive shaft 4 extends in the vehicle width direction through a portion between the fourth shift fork 64a and the second shift fork 62a which are separately arranged in the vehicle front-rear direction.

In the vehicle 1, the transmission 3 is arranged in the vicinity of the drive shaft 4 in the vehicle-body rear portion, and the drive shaft 4 extends in the vehicle width direction on a central side in the vehicle front-rear direction and on a central side in the vehicle up-down direction of the transmission mechanism unit 20 of the transmission 3 and extends in the vehicle width direction such that the drive shaft 4 passes through the transmission casing 11. As for the drive shaft 4b on the vehicle right side, a portion of the drive shaft 4b passes through the side face portion 11b on the vehicle right side of the transmission casing 11, and a portion of the drive shaft 4b, which is positioned on the vehicle left side of the above portion of the drive shaft 4b, passes through the side face portion 11b on the vehicle left side of the transmission casing 11.

The drive shaft 4 extends in the vehicle width direction through a portion between the transmission gear unit 21 and the transmission gear operation unit 22 of the transmission mechanism unit 20 and extends in the vehicle width direction in a position, in the vehicle front-rear direction, corresponding to the predetermined gear train G3 of which the first gear and the second gear have small dimensions in the up-down direction among the plurality of gear trains G1 to G6 configuring the transmission gear unit 21.

In the present embodiment, the input shaft 30, the output shaft 40, and the counter shaft 50 are capable of being arranged while being offset in the vehicle up-down direction but are preferably arranged in positions overlapping with each other in the vehicle up-down direction. The differential device 7 is arranged on the vehicle left side of the transmission 3 but is also capable of being arranged on the vehicle right side of the transmission 3.

Further, as the actuator causing the plurality of shift rods 61, 62, 63, and 64 to be operated to move, the motor 66 is used, and an electric actuator is used; however, an actuator such as a hydraulic actuator may be used to cause the plurality of shift rods 61, 62, 63, and 64 to be operated to move. In the present embodiment, the transmission 3 is used which causes the shift rods 61, 62, 63, and 64 to be operated to move by the actuator on the basis of a manual transmission, but the transmission 3 is similarly applicable to a manual transmission.

As described above, the motive power transmission device 5 for a vehicle according to the present embodiment includes the transmission 3 that outputs motive power input from a drive source (e.g., engine 2) while performing gear-shifting for the motive power and the drive shaft 4 that is coupled with the transmission 3 and transmits the motive power from the drive source, which is output from the transmission 3, to the drive wheels (e.g., rear wheels 6). The transmission 3 has the transmission mechanism unit 20 that is arranged in the transmission casing 11 such that the axis line thereof extends in the vehicle front-rear direction and that performs gear-shifting for the motive power from the drive source. The drive shaft 4 extends in the vehicle width direction on a central side of the transmission mechanism unit 20 in the vehicle front-rear direction and is provided such that the drive shaft 4 passes through the transmission casing 11.

Accordingly, in a case where the transmission 3 is arranged in the vicinity of the drive shaft 4 in the vehicle-body rear portion in the vehicle 1 including the longitudinal placement type transmission 3, because the drive shaft 4 extends in the vehicle width direction on a central side of the transmission mechanism unit 20 in the vehicle front-rear direction such that the drive shaft 4 passes through the transmission casing 11, lowering of the comfort of an occupant due to narrowing of a vehicle cabin space by the transmission can be inhibited compared to a case where the transmission is arranged on the vehicle front side of the drive shaft. Further, lowering of operation stability due to enlargement of an overhang on the vehicle rear side can be inhibited compared to a case where the transmission is arranged on the vehicle rear side of the drive shaft.

Consequently, in a case where the transmission 3 is arranged in the vicinity of the drive shaft 4 in the vehicle-body rear portion in the vehicle 1 including the longitudinal placement type transmission 3, both comfort of an occupant and operation stability can be achieved.

Further, the drive shaft 4 extends in the vehicle width direction on a central side of the transmission mechanism unit 20 in the vehicle up-down direction. Accordingly, the position of the center of gravity of the vehicle 1 is lowered compared to a case where the transmission is arranged above the drive shaft 4, and operation stability can thereby be improved. Further, compared to a case where the transmission is arranged below the drive shaft, a gap from the ground surface is increased, and ground clearance can thereby be secured.

Further, the transmission mechanism unit 20 includes the input shaft 30 and the output shaft 40 that are arranged on the same axis line, the counter shaft 50 that is arranged in parallel with the input shaft 30 and the output shaft 40, and the transmission gear unit 21 that has the plurality of gear trains G1 to G6 which are respectively formed with the first gears provided to the input shaft 30 or the output shaft 40 and the second gears provided to the counter shaft 50 and meshing with the first gears, and the drive shaft 4 extends in the vehicle width direction in a position, in the vehicle front-rear direction, corresponding to the predetermined gear train G3 of which the first gear and the second gear have small dimensions in the up-down direction among the plurality of gear trains G1 to G6.

Accordingly, the drive shaft 4 is arranged close to the axis line of the transmission mechanism unit 20, and the transmission 3 and the drive shaft 4 can thereby be arranged compactly in the vehicle up-down direction.

Further, the transmission mechanism unit 20 includes the input shaft 30 and the output shaft 40 that are arranged on the same axis line, the counter shaft 50 that is arranged in parallel with the input shaft 30 and the output shaft 40, the transmission gear unit 21 that has the plurality of gear trains G1 to G6 which are respectively formed with the first gears provided to the input shaft 30 or the output shaft 40 and the second gears provided to the counter shaft 50 and meshing with the first gears, and the transmission gear operation unit 22 that operates the transmission gear unit 21, and the drive shaft 4 extends in the vehicle width direction through a portion between the transmission gear unit 21 and the transmission gear operation unit 22.

Accordingly, compared to a case where the drive shaft extends in the vehicle width direction through a portion in the transmission gear unit and a portion in the transmission gear operation unit, the drive shaft 4 can be arranged with high assemblability between the transmission gear unit 21 and the transmission gear operation unit 22 that are dispersedly arranged in the vehicle up-down direction, and the drive shaft 4 and the transmission 3 can thereby be arranged with high assemblability.

Further, the motive power transmission device 5 for a vehicle includes the differential device 7 that is coupled with the transmission 3 and coupled with the drive shaft 4 and transmits the motive power from the drive source (e.g., engine 2), which is output from the transmission 3, to the drive shaft 4.

Accordingly, in the vehicle 1 including the differential device 7 that is coupled with the longitudinal placement type transmission 3 and coupled with the drive shaft 4, the drive shaft 4 extends in the vehicle width direction on a central side of the transmission mechanism unit 20 in the vehicle front-rear direction such that the drive shaft 4 passes through the transmission casing 11, and both comfort of an occupant and operation stability can thereby be achieved.

Further, the motive power transmission device 5 for a vehicle includes the differential housing 14 in which the differential device 7 is housed, and the differential housing 14 is integrally formed with the transmission casing 11. Accordingly, compared to a case where the differential housing is arranged in the vehicle width direction without being integrally formed with the transmission casing 11, the differential housing 14 and the transmission casing 11 can compactly be formed.

The present disclosure is not limited to the embodiment described as an example, but various improvements and changes in design are possible without departing from the scope of the gist of the present disclosure.

INDUSTRIAL APPLICABILITY

As described in the foregoing, according to the present disclosure, in a case where a longitudinal placement type transmission is arranged in the vicinity of a drive shaft in a vehicle-body rear portion, both comfort of an occupant and operation stability can be achieved, and suitable use is thus possible in a vehicle including a longitudinal placement type transmission.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

REFERENCE CHARACTERS LIST 1 vehicle
2 engine
3 transmission
4 drive shaft
5 motive power transmission device
6 rear wheel
7 differential device
11 transmission casing
14 differential housing
20 transmission mechanism unit
21 transmission gear unit
22 transmission gear operation unit
30 input shaft
31 to 36 first gear
40 output shaft
41 to 46 second gear
50 counter shaft
G1 to G6 gear train

The invention claimed is:

1. A motive power transmission device for a vehicle, comprising:
a transmission that outputs motive power input from a drive source while performing gear-shifting for the motive power; and
a drive shaft that is coupled with the transmission and transmits the motive power from the drive source, which is output from the transmission, to a drive wheel, wherein
the transmission has a transmission mechanism unit that is arranged in a transmission casing such that an axis line thereof extends in a vehicle front-rear direction and that performs gear-shifting for the motive power from the drive source,
the drive shaft extends in a vehicle width direction on a central side of the transmission mechanism unit in the vehicle front-rear direction and is provided such that the drive shaft passes through the transmission casing,
the transmission mechanism unit includes an input shaft and an output shaft that are arranged on the same axis line, a counter shaft that is arranged in parallel with the input shaft and the output shaft, and a transmission gear unit that has a plurality of gear trains, each of which is formed with a first gear provided to the input shaft or the output shaft and a second gear provided to the counter shaft and meshing with the first gear, and
the drive shaft extends in the vehicle width direction in a position, in the vehicle front-rear direction, corresponding to a predetermined gear train of which the first gear and the second gear have small dimensions in an up-down direction among the plurality of gear trains.

2. The motive power transmission device for a vehicle according to claim 1, wherein
the transmission mechanism unit includes a transmission gear operation unit that operates the transmission gear unit, and
the drive shaft extends in the vehicle width direction through a portion between the transmission gear unit and the transmission gear operation unit.

3. The motive power transmission device for a vehicle according to claim 1, further comprising:
a differential device that is coupled with the transmission and coupled with the drive shaft and transmits the motive power from the drive source, which is output from the transmission, to the drive shaft.

4. The motive power transmission device for a vehicle according to claim 3, further comprising:
a differential housing in which the differential device is housed, the differential housing being integrally formed with the transmission casing.

5. The motive power transmission device for a vehicle according to claim 4, wherein
the transmission casing includes a bottom surface portion, side face portions on both sides in the vehicle width direction, and a top face portion, and
the side face portion on a vehicle left side is integrally formed with the differential housing and is provided with a shaft insertion portion through which the drive shaft extending from the differential device to a vehicle right side is inserted.

6. A motive power transmission device for a vehicle, comprising:
a transmission that outputs motive power input from a drive source while performing gear-shifting for the motive power; and
a drive shaft that is coupled with the transmission and transmits the motive power from the drive source, which is output from the transmission, to a drive wheel, wherein
the transmission has a transmission mechanism unit that is arranged in a transmission casing such that an axis line thereof extends in a vehicle front-rear direction and that performs gear-shifting for the motive power from the drive source,
the drive shaft extends in a vehicle width direction on a central side of the transmission mechanism unit in the vehicle front-rear direction and is provided such that the drive shaft passes through the transmission casing,
the transmission mechanism unit includes an input shaft and an output shaft that are arranged on the same axis line, a counter shaft that is arranged in parallel with the input shaft and the output shaft, a transmission gear unit that has a plurality of gear trains, each of which is formed with a first gear provided to the input shaft or the output shaft and a second gear provided to the counter shaft and meshing with the first gear, and a transmission gear operation unit that operates the transmission gear unit, and
the drive shaft extends in the vehicle width direction through a portion between the transmission gear unit and the transmission gear operation unit.

7. The motive power transmission device for a vehicle according to claim 1, further comprising:
a differential device that is coupled with the transmission and coupled with the drive shaft and transmits the motive power from the drive source, which is output from the transmission, to the drive shaft.

8. The motive power transmission device for a vehicle according to claim 7, further comprising:

a differential housing in which the differential device is housed, the differential housing being integrally formed with the transmission casing.

9. The motive power transmission device for a vehicle according to claim 8, wherein the transmission casing includes a bottom surface portion, side face portions on both sides in the vehicle width direction, and a top face portion, and the side face portion on a vehicle left side is integrally formed with the differential housing and is provided with a shaft insertion portion through which the drive shaft extending from the differential device to a vehicle right side is inserted.

10. A motive power transmission device for a vehicle, comprising:

a transmission that outputs motive power input from a drive source while performing gear-shifting for the motive power; and a drive shaft that is coupled with the transmission and transmits the motive power from the drive source, which is output from the transmission, to a drive wheel, wherein the transmission has a transmission mechanism unit that is arranged in a transmission casing such that an axis line thereof extends in a vehicle front-rear direction and that performs gear-shifting for the motive power from the drive source, the drive shaft extends in a vehicle width direction on a central side of the transmission mechanism unit in the vehicle front-rear direction and is provided such that the drive shaft passes through the transmission casing, the drive shaft extends in the vehicle width direction through a portion among a plurality of shift forks, which are separately arranged in the vehicle front-rear direction, in the transmission, the plurality of shift forks includes, in order from a vehicle front side, a first shift fork, a fourth shift fork, a second shift fork, and a third shift fork, and the drive shaft extends in the vehicle width direction through a portion between the fourth shift fork and the second shift fork.

* * * * *